UNITED STATES PATENT OFFICE.

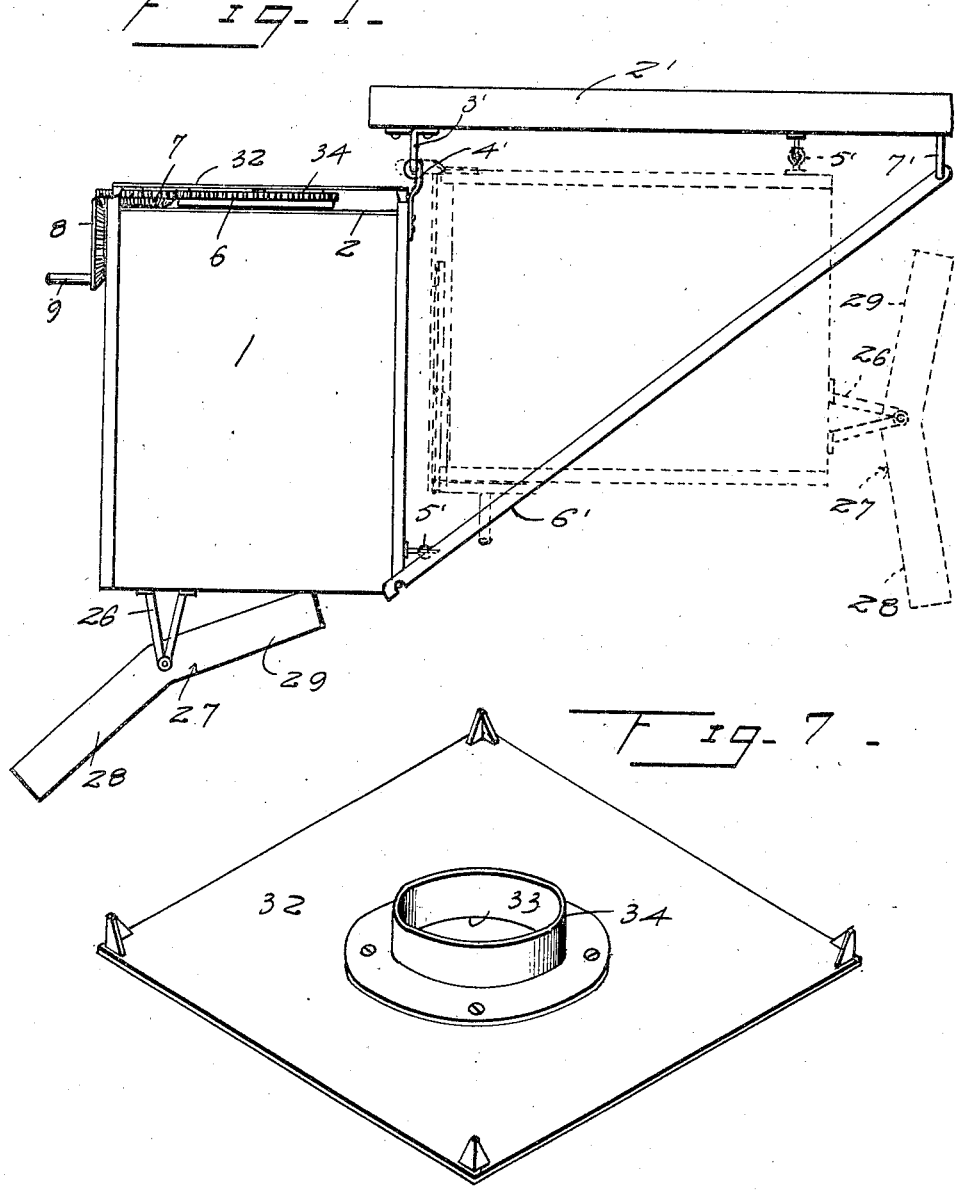

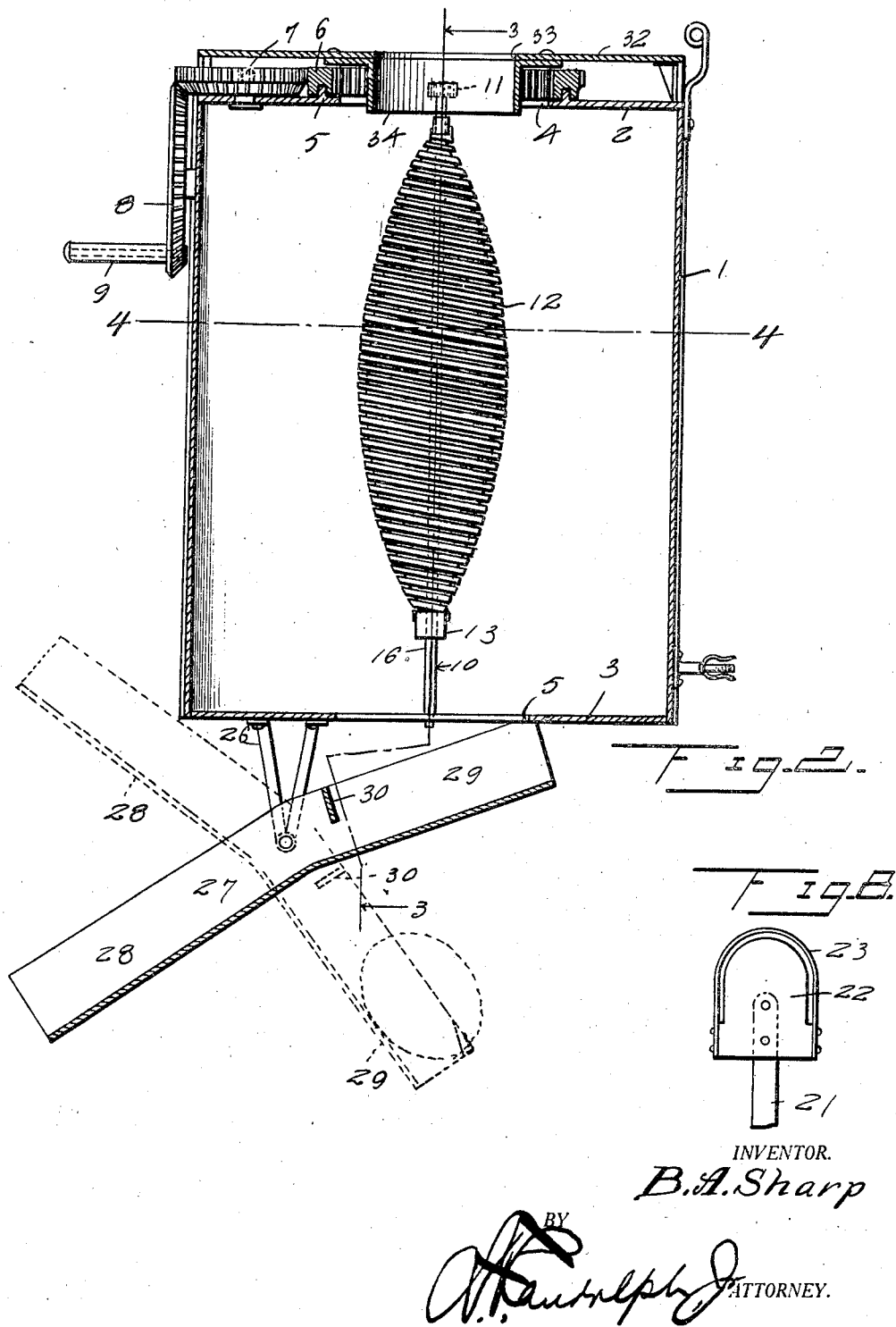

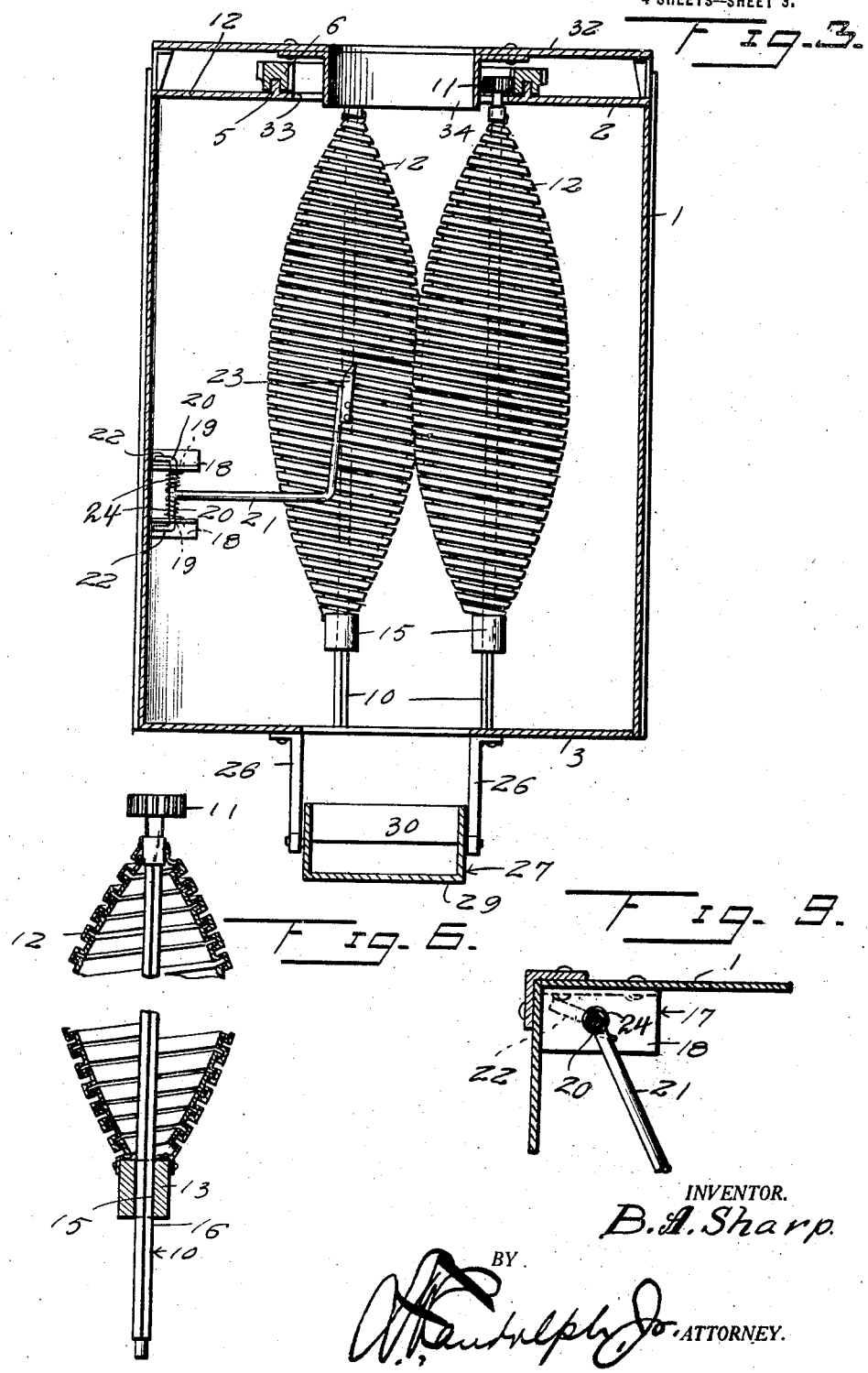

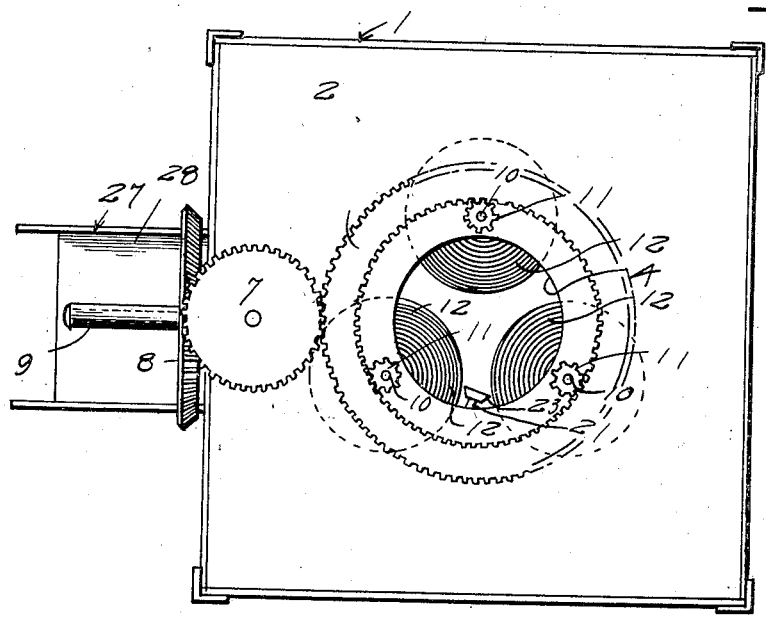
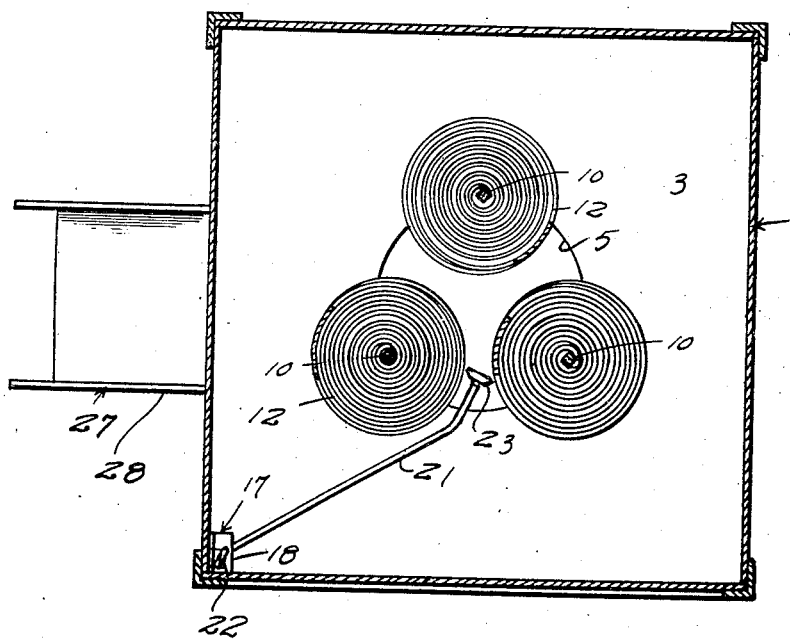

BARNEY A. SHARP, OF LOS ANGELES, CALIFORNIA.

POTATO-PEELING MACHINE.

1,380,259.      Specification of Letters Patent.      Patented May 31, 1921.

Application filed July 23, 1920. Serial No. 398,369.

*To all whom it may concern:*

Be it known that I, BARNEY A. SHARP, a citizen of the United States, residing at Los Angeles, in the county of Los Angeles and State of California, have invented certain new and useful Improvements in Potato-Peeling Machines; and I do hereby declare the following to be a full, clear, and exact description of the invention, such as will enable others skilled in the art to which it appertains to make and use the same.

This invention relates to new and useful improvements in potato peeling machines and has for its primary object the provision of means for feeding potatoes by and against a knife so that the rind or peeling thereof will be efficiently and evenly removed therefrom.

Another object of this invention is the provision of means for rotating the potatoes as they pass the knife which permits the rind or peeling to be removed in a circular manner and as accomplished when peeling potatoes by hand, and which means is capable of accommodating potatoes of different sizes.

A further object of this invention is the provision of means separating the potatoes from the peelings or rinds as they are discharged from the device after the peeling process.

A still further object of this invention is the provision of a potato peeling machine of the above stated character, which shall be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description, and accompanying drawings, in which:—

Figure 1 is a side elevation of a potato peeling machine constructed in accordance with my invention, Fig. 2 is a vertical sectional view of the same, Fig. 3 is a longitudinal sectional view taken on the line 3—3 of Fig. 2, Fig. 4 is a transverse sectional view taken on the line 4—4 of Fig. 2, Fig. 5 is a plan view of the device with the top wall removed, Fig. 6 is a vertical sectional view of one of the feeding members, Fig. 7 is a perspective view of the top wall, illustrating the guard for the gears, Fig. 8 is a detail view of the knife, Fig. 9 is a detail view of the mounting for the knife.

Referring in detail to the drawings, the numeral 1 indicates a casing which has its top and bottom walls 2 and 3 provided with alining openings 4 and 5 respectively. The top wall 2 about the opening 4 is provided with an annular supporting flange 5 on which is mounted an internal and external gear 6. The gear 6 is provided with an annular groove that receives the flange 5 whereby said gear is rotatably mounted upon the top wall 2. A pinion 7 is journaled to the top wall 2 and in mesh with the external teeth of the gear 6 and also meshes with a drive gear 8 journaled to one of the side walls of the casing 1 and which drive gear is provided with a handle 9 so that the same can be manually rotated.

Shafts 10 have their upper and lower ends journaled in the top and bottom walls 2 and 3 and have secured to their upper ends pinions 11 which mesh with the internal teeth on the gear 6. The shafts 10 are arranged in circular formation and have secured thereon feeding elements 12. The feeding elements 12 are preferably constructed from sheet metal, which is formed in strip formation and which is of substantially S-shape in cross section. The strips of material are bent in coil formation having one of their ends secured to the upper ends of the shafts 10 while their lower ends are secured to weights 13 slidably mounted on the shafts 10.

The convolutions of the strips increase in size from each end of the shafts to a point intermediate their ends. The weights 13 are provided with rectangular openings 15 to receive squared portions 16 on the lower portions of the shafts 10 so that said weights 13 will be compelled to rotate with the shafts but will be free to slide upwardly and downwardly thereon for the purpose of permitting the feeding elements 12 to expand and contract to accommodate potatoes of different sizes. The potatoes are adapted to be fed into the opening 4 and received by the feeding elements 12 and are gripped thereby causing the potatoes to rotate with said feeding elements and owing to their particular formation the potatoes are fed in a downwardly direction and eventually escape from the casing through the outlet opening 5.

A bracket 17 consisting of a pair of angle irons 18 is secured to one side wall of the casing and is provided with alining openings 19 to receive oppositely disposed projections 20 formed on a knife supporting arm 21. The ends of the extensions 20 are bent at right angles to form stops 22 adapted to engage the angle irons for limiting the movement of the knife 21 in one direction. The free end of the arm 21 is bent at right angles and supports a block 22 at a point between the feeding elements 12.

The arm 21 has secured thereto a knife blade 23 which is adapted to engage the potatoes as they pass downwardly under the influence of the feeding elements 12 and owing to the rotation of the potatoes, the knife removes the rind or peeling therefrom. Springs 24 are secured to the extensions and to the angle irons of the bracket 17 for the purpose of urging the knife in the direction or against the potatoes. It is to be noted that the knife will remove the rind or peeling from the potatoes in a circular path owing to the rotation of the potato by the feeding elements as the same passes said knife.

Brackets 26 are secured to the bottom wall 3 of the casing 1 and have pivoted thereto a chute 27. The portion 28 of the chute 27 is much longer than the portion 29 so that the portion 28 normally depends downwardly while the portion 29 is disposed in a substantially horizontal plane under the discharge or outlet opening 5 to receive the peelings from the casing and the peelings will slide downwardly of the portion 28 and when a potato is discharged from the casing, it drops upon the portion 29 and owing to the weight thereof it forces said portion 29 downwardly permitting the potato to slide off of the same into a suitable container not shown. A guard 30 is secured to the portion 29 of the chute 27 adjacent the pivotal point and is spaced from the bottom wall of said chute so that the peelings can readily pass under the same and slide off of the portion 28 but will prevent a potato from sliding or rolling in this direction and as a potato strikes the guard, it holds the same against further movement until the chute has time to swing on its pivot to dispose the portion 29 downwardly in an inclined plane, whence the potato rolls off of the chute.

An auxiliary cover or top wall 32 is secured to the casing 1 over the top wall 2 and is adapted to overlie and protect the gears 6 and 7. The auxiliary top wall 32 is provided with an opening 33 to permit the potato to be fed into the casing. An annular collar or guard 34 is formed on the bottom face of the auxiliary top wall 32 and about the opening 33 and depends downwardly into the opening 4 of the top wall 2 so that the potatoes are prevented from coming in contact with the pinions 11 and gear 6 as they pass into the casing.

In Fig. 1 I have shown my invention secured to a table 2' by means of a bracket 3' to which straps 4' are hinged and are in turn secured to the casing so that said casing may be swung to underlie the table and be supported thereunder by a fastener 5'. When desiring to use the device, the same is moved to depend downwardly from the table and a pair of braces 6' having notches in each end engage pins on the casing 1 and a bracket 7' secured to the table, thereby firmly holding the device during the operation of the device. The braces are removed and placed on the brackets 3' and 7' when the casing is positioned under the table.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A potato peeling machine comprising a casing having inlet and outlet ports, potato feeding elements journaled in said casing between the ports and adapted to impart rotation to a potato during its passage from one port to the other, and a knife for removing the peelings from the potatoes as they are fed in the direction of the outlet port.

2. A potato peeling machine comprising a casing having inlet and outlet ports, circularly arranged feeding elements journaled in said casing between the inlet and outlet ports, means for rotating said feeding elements, and a knife adapted to remove the peeling from the potatoes as they are fed in the direction of the outlet port.

3. A potato peeling machine comprising a casing having inlet and outlet ports, vertically disposed and circularly arranged feeding elements journaled in said casing between the inlet and outlet ports, means for rotating said feeding elements, and a knife adapted to remove the peeling from a potato as it is fed in the direction of the outlet port by the feeding elements.

4. A potato peeling machine comprising a casing having inlet and outlet ports, flexible feeding elements journaled in said casing between the inlet and outlet ports and adapted to feed a potato in the direction of the outlet port, and a knife adapted to engage the potato and remove the peeling therefrom.

5. A potato peeling machine comprising a casing having inlet and outlet ports, vertically disposed flexible and circularly arranged feeding elements journaled in said casing between the inlet and outlet ports and adapted to feed a potato from the inlet port to the outlet port with a rotary motion, means for rotating the feeding elements, and a knife for removing the peelings from the potatoes.

6. A potato peeling machine comprising a casing having inlet and outlet ports, shafts journaled in said casing, means for rotating said shafts, flexible elements carried by said shafts and adapted to bight into a potato for rotating and feeding the same in the direction of the outlet port, and a knife for removing the peelings from the potatoes.

7. A potato peeling machine comprising a casing having inlet and outlet ports, shafts journaled in said casing, flexible elements secured to the upper ends of said shafts and coiled about said shafts and having their lower ends slidably secured to said shafts, means rotating said shafts, and a knife associated with the feeding elements.

8. A potato peeling machine comprising a casing having inlet and outlet ports, shafts journaled in said casing, means for rotating said shafts, flexible elements secured to the upper ends of the shafts and coiled about said shafts, weights slidably secured to the lower ends of the shafts and adapted to rotate with said shafts and secured to the lower ends of the flexible elements, and a knife associated with the flexible elements.

9. A potato peeling machine comprising a casing having inlet and outlet ports, shafts journaled in said casing, flexible elements having their upper ends secured to the upper ends of the shafts and coiled about said shaft and slidably secured to the lower ends of said shafts, said flexible elements being of substantially S-shape in cross section to form gripping edges and the convolutions of said flexible elements increasing from each end in the direction of a point intermediate the ends of the shafts, and a knife associated with the flexible elements.

10. A potato peeling machine comprising a casing having inlet and outlet ports, shafts journaled in said casing, feeding elements carried by said shafts, a knife associated with the feeding elements, internal and external gears rotatably mounted in said casing, pinions secured to the upper ends of the shafts and in mesh with the internal teeth of said gears, a pinion journaled to said casing and meshing with the external teeth of said gear, and a drive gear journaled to said casing and rotating with the second named pinion.

11. A potato peeling machine comprising a casing having inlet and outlet ports, feeding elements journaled in said casing, a knife associated with the feeding elements, a series of gears carried by said casing for rotating said feeding elements, an auxiliary cover secured to the casing and having an opening, a guard surrounding said opening and extending into the inlet opening of the casing.

12. A potato peeling machine comprising a casing having inlet and outlet openings, feeding elements journaled in said casing, brackets secured to said casing, an arm pivoted to said brackets, tension means connected to said arm, means limiting the movement of the arm in one direction, and a knife carried by said arm and associated with the feeding elements.

13. A potato peeling machine comprising a casing having inlet and outlet openings, feeding elements journaled in said casing, means rotating said feeding elements, a knife associated with the feeding elements, a bracket carried by said casing, a chute pivoted to said bracket and located under the outlet opening and having a comparatively long portion and a comparatively short portion, said long portion adapted to normally depend downwardly and the comparatively short portion normally maintaining a substantially horizontal position under the outlet opening to receive the potato peelings therefrom, and a guard carried by the comparatively short portion adjacent the pivotal point of the chute.

In testimony whereof I affix my signature in presence of two witnesses.

BARNEY A. SHARP.

Witnesses:
ERNEST WAMSTER,
JESSE M. JENKINS.